US012583237B2

(12) United States Patent
Saiki et al.

(10) Patent No.: US 12,583,237 B2
(45) Date of Patent: Mar. 24, 2026

(54) RECORDING APPARATUS

(71) Applicant: CANON KABUSHIKI KAISHA, Tokyo (JP)

(72) Inventors: Waichiro Saiki, Kanagawa (JP); Tomoyuki Nagase, Kanagawa (JP); Toshiro Sugiyama, Kanagawa (JP); Toshinobu Tokita, Kanagawa (JP); Takeshi Koda, Kanagawa (JP); Yasuyuki Asai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 18/513,236

(22) Filed: Nov. 17, 2023

(65) Prior Publication Data

US 2024/0174005 A1 May 30, 2024

(30) Foreign Application Priority Data

Nov. 30, 2022 (JP) ................................ 2022-192357
Nov. 30, 2022 (JP) ................................ 2022-192358

(51) Int. Cl.

| | |
|---|---|
| ***B41J 11/00*** | (2006.01) |
| ***B41J 2/17*** | (2006.01) |
| ***B41J 11/24*** | (2006.01) |
| ***B41J 29/12*** | (2006.01) |
| ***B41J 29/13*** | (2006.01) |
| ***B41J 29/377*** | (2006.01) |

(52) U.S. Cl.

CPC ........... *B41J 11/007* (2013.01); *B41J 2/1714* (2013.01); *B41J 11/0022* (2021.01); *B41J 11/24* (2013.01); *B41J 29/12* (2013.01); *B41J 29/13* (2013.01); *B41J 29/377* (2013.01)

(58) Field of Classification Search

CPC . B41J 11/0022; B41J 11/00222; B41J 11/007; B41J 11/24; B41J 29/12; B41J 29/13; B41J 29/377; B41J 2/1714

See application file for complete search history.

(56) References Cited

U.S. PATENT DOCUMENTS 9,770,928 B2 * 9/2017 Harayama ............ B41J 11/0022
9,987,858 B2 6/2018 Perez Gellida et al.
10,639,915 B2 * 5/2020 Wakita .................. B41J 11/001
(Continued)

*Primary Examiner* — Stephen D Meier
*Assistant Examiner* — Thomas Ray Knief
(74) *Attorney, Agent, or Firm* — Canon U.S.A., Inc. IP Division

(57) ABSTRACT

A recording apparatus includes a recording head, a conveyance unit, a housing, and first and second heating units. The recording head performs recording in a recording region by discharging liquid onto a recording medium conveyed in a first direction by the conveyance unit. The housing has an opening in a side surface of the housing. The first heating unit is arranged upstream of the recording head in the first direction in the housing, includes a first heater and a first fan, and blows air in the recording region. The second heating unit is arranged downstream of the recording head in the first direction outside the housing, includes a second heater and a second fan, and blows warm air to the recording medium. The second fan suctions air from an air suction unit that faces the recording medium and is arranged below the side surface opening in a gravitational direction.

18 Claims, 12 Drawing Sheets

(56) References Cited

U.S. PATENT DOCUMENTS

| | | | | |
|---|---|---|---|---|
| 2013/0328963 | A1* | 12/2013 | Domae | B41J 29/377 347/18 |
| 2016/0243853 | A1* | 8/2016 | Nakano | B41J 11/00216 |
| 2019/0001707 | A1* | 1/2019 | Yoda | B41J 11/00216 |
| 2020/0307186 | A1 | 10/2020 | Asamoto et al. | |
| 2021/0031510 | A1* | 2/2021 | Asamoto | B41J 11/0021 |

* cited by examiner

RECORDING APPARATUS

BACKGROUND

Field

The present disclosure relates to a recording apparatus.

Description of the Related Art

Recently, it has become possible for ink jet recording apparatuses using pigment ink to achieve both superior color production comparable to dye ink, and image fastness, which indicates strength of images and long storage stability, because of the development of manufacturing techniques. As a result, the ink jet recording apparatuses have become widely used for public display uses such as outdoor posters, point-of-purchase (POP) posters, facility signs, and displays, in addition to photographic uses for which preservation of recorded images is highly demanded for a long time. There is also a strong demand for a higher productivity for large-format printing uses of such printed images. Further, to reduce print costs for high-mix low-volume print products, there has been an increasing demand for inkjet recording to the print paper, which is coated paper for printing used for business and publishing, and polyvinyl chloride sheets (hereinbelow, referred to as PVC sheets) used for wallpaper, tarpaulin, and the like.

In general, unlike special paper for inkjet printing and normal paper with a surface provided with a receiving layer excellent in permeability to aqueous ink used for the ink jet recording apparatuses, the PVC sheets or the like used for printing the wallpaper or the like have no permeability to the aqueous ink. If ink droplets remain in liquid state on such a recording medium for a long time, it may induce apparent image degradation. Thus, as a method for recording an image onto a recording medium with low or no ink permeability to the aqueous ink, a method of blowing air and/or heating are used to accelerate evaporation of solutions, such as water in the ink droplets on the recording medium and solvents to fix color materials on the surface of the recording medium. U.S. Pat. No. 9,987,858 discusses a configuration of a recording apparatus including a heating and blowing unit for blowing air under a recording head, and a heating and blowing unit provided downstream of the recording head in a conveyance direction of a recording medium for blowing warm air to the recording medium.

SUMMARY

The present disclosure is directed to a technique for preventing reduction in performance of a heating unit.

According to an aspect of the present disclosure, a recording apparatus includes a recording head configured to discharge liquid onto a recording medium to perform recording in a recording region, a conveyance unit configured to convey the recording medium in a first direction, a housing configured to cover the recording head, and having an opening in a side surface of the housing on a downstream side of the recording head in the first direction, a first heating unit that is arranged upstream of the recording head in the first direction in the housing, that includes a first heater and a first fan, and is configured to blow air in the recording region, and a second heating unit that is arranged downstream of the recording head in the first direction outside the housing, that includes a second heater and a second fan, and is configured to blow warm air to the recording medium, wherein the second fan is configured to suction air from an air suction unit disposed to face the recording medium, and the air suction unit is arranged below the side surface opening in a gravitational direction.

Further features of the present disclosure will become apparent from the following description of exemplary embodiments with reference to the attached drawings.

DESCRIPTION OF THE EMBODIMENTS

Figure 1:
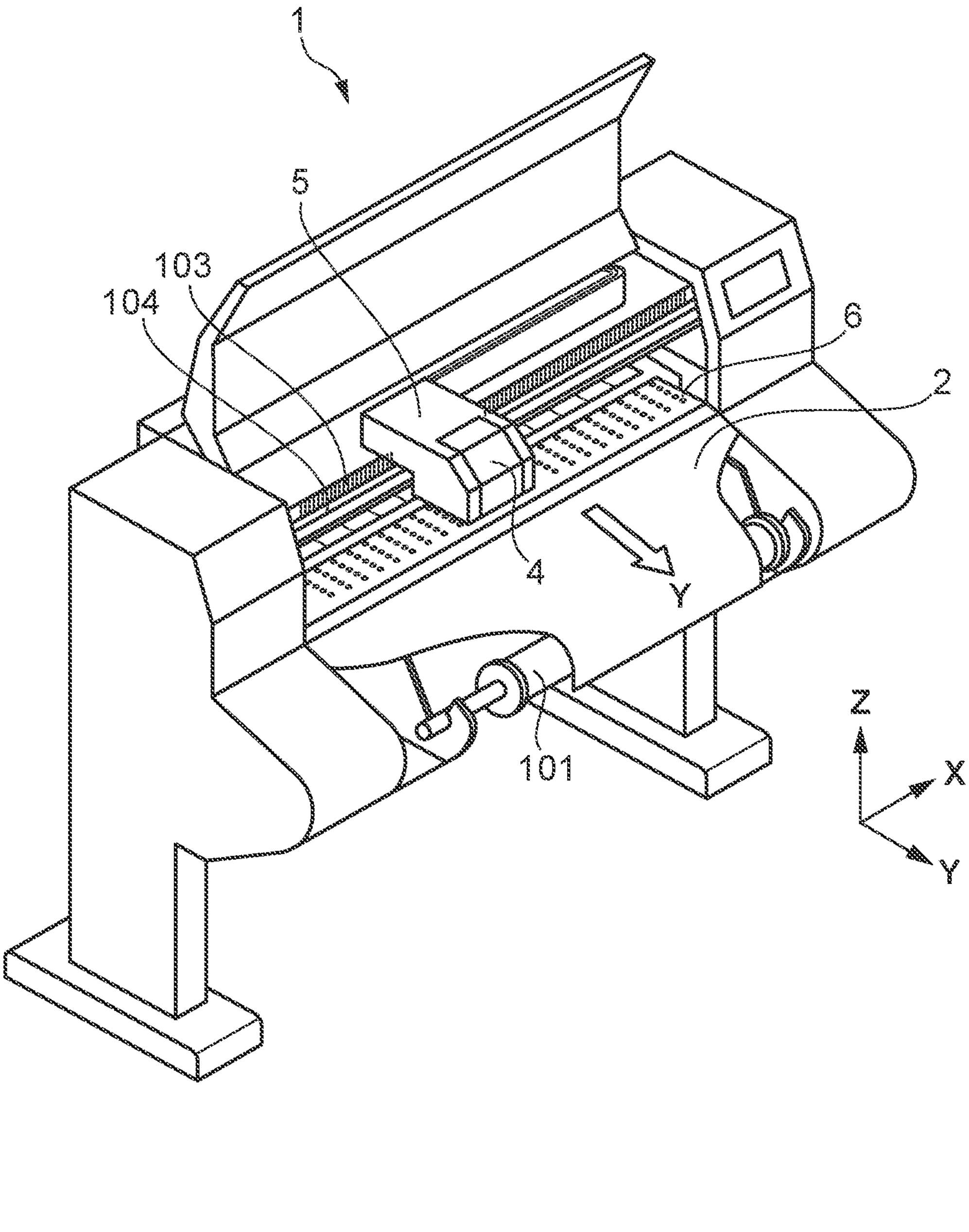
FIG. 1 is a diagram illustrating an external appearance of a recording apparatus according to a first exemplary embodiment.

Hereinbelow, exemplary embodiments of the present disclosure will be described with reference to the accompanying drawings. In the drawings, the same numerals are assigned to the same members and components, and duplicate descriptions thereof are omitted or simplified. Arrows in the drawings schematically indicate flows of air in apparatuses.

Figure 2A:
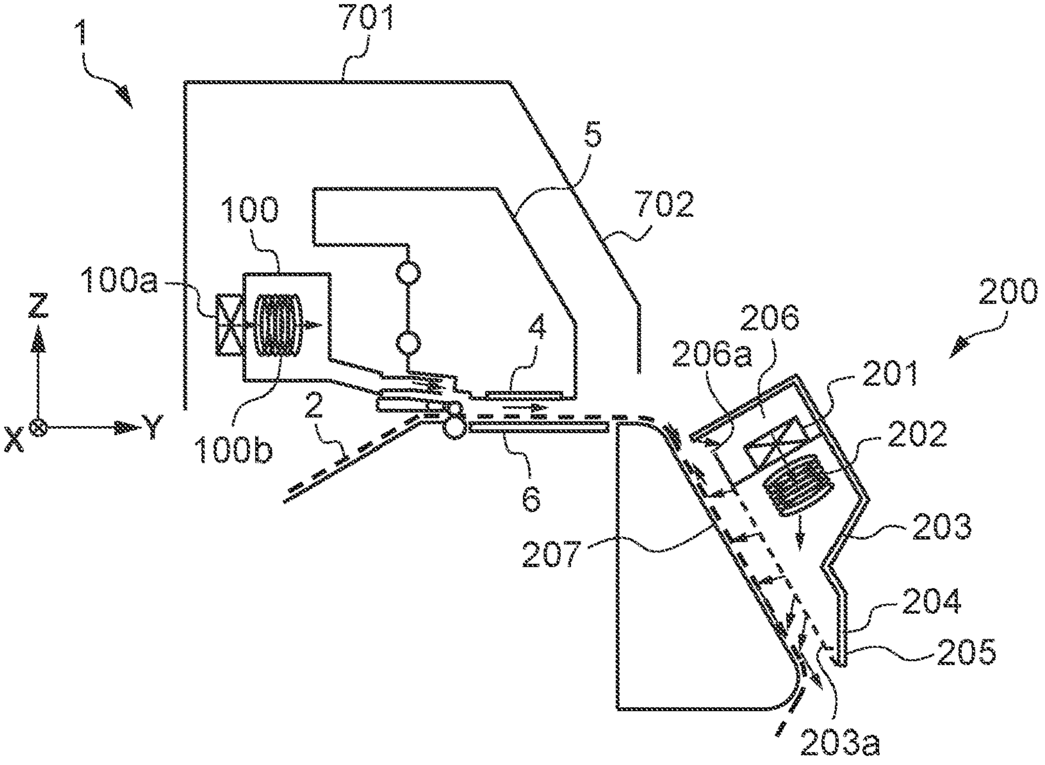
FIGS. 2A and 2B are a cross-section diagram schematically illustrating the recording apparatus viewed in an X direction, and a perspective diagram schematically illustrating a housing and a fixing unit of the recording apparatus, respectively.
Figure 2B:
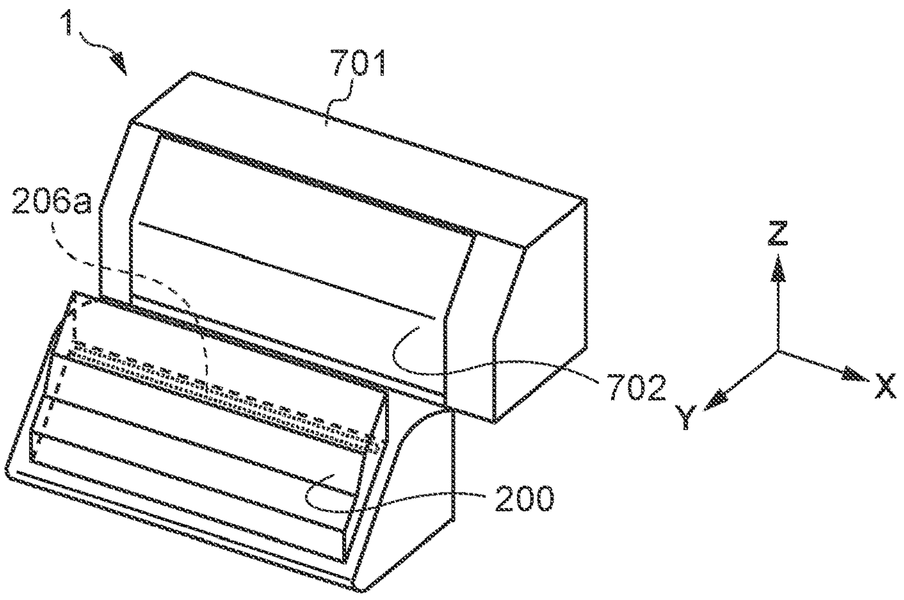

A configuration of a recording apparatus 1 and operations thereof during recording will be schematically described with reference to FIGS. 1, 2A, and 2B. FIG. 1 is a diagram illustrating an appearance of the recording apparatus (ink jet recording apparatus) 1 according to a first exemplary embodiment, FIG. 2A is a diagram schematically illustrating the recording apparatus 1 viewed in an X direction, and FIG. 2B is a perspective view illustrating a housing 701 and a fixing unit 200 of the recording apparatus 1.

A recording medium 2 is conveyed by a conveyance roller driven by a conveyance motor (not illustrated) via a gear in a Y direction from a spool 101 that is holding the recording medium 2. The fed recording medium 2 is pinched and conveyed by a sheet feed roller and a pinch roller, and guided to a recording position (scanning region of a recording head 4) on a platen 6. The platen 6 suctions air through a suction port (not illustrated) to prevent the recording medium 2 from floating, and the recording medium 2 guided onto the platen 6 is conveyed in the Y direction while being suctioned by the platen 6. In the present specification, a positive direction to a direction in which the recording medium 2 is conveyed, or a direction toward a discharge guide 207 (described below) from the platen 6 is sometimes referred to as "downstream (side) in a conveyance direction". The direction opposite to the conveyance direction, or a direction toward the platen 6 from the discharge guide 207 is sometimes referred to as "upstream (side) in the conveyance direction".

A carriage unit 5 performs reciprocating scanning operations (back and forth movement) via a carriage motor (not illustrated) in the X direction along a guide shaft 104 extending in the X direction orthogonal to the Y direction. The recording head 4 is mounted on the carriage unit 5. The recording head 4 discharges ink supplied from an ink tank (not illustrated) connected thereto through a plurality of nozzles (discharge ports) provided in the bottom surface of the recording head 4. During the scanning process of the carriage unit 5, the recording head 4 performs the ink discharge operation through nozzles of the recording head 4 at a timing based on a position signal obtained from an encoder 103 to perform recording of a predetermined bandwidth corresponding to an array range of the discharge ports. The recording medium 2 is then conveyed, and the recording of the next band width is further performed. In this way, the conveyance of the recording medium 2 and the recording scanning of the recording head 4 are alternately performed, so that a desired image is recorded on the recording medium 2.

The recording apparatus 1 is provided with a platen air blowing unit 100 for blowing air to the scanning region of the recording head 4. The platen air blowing unit 100 includes a platen air blowing fan 100*a* and a heater 100*b*. The air blown into the platen air blowing unit 100 by the platen air blowing fan 100*a* is heated by the heater 100*b* to a predetermined temperature, and blown onto the platen 6. In a case where the recording medium 2 is present on the platen 6, the air blown from the platen air blowing unit 100 is blown onto the recording medium 2. The air blown from the platen air blowing unit 100 accelerates evaporation of water contained in ink given onto the recording medium 2 by the recording head 4. The air blown from the platen air blowing unit 100 further makes it possible to remove ink mist occurring near the recording head 4 during the recording operation of the recording head 4, from near the recording head 4. In addition, the platen air blowing unit 100 may exclude the heater 100*b*, and may blow air onto the recording medium 2 without heating the air suctioned into the platen air blowing unit 100 by the platen air blowing fan 100*a*.

The recording head 4, the carriage unit 5, the platen air blowing unit 100, and the platen 6 are provided in the housing 701, and an access cover 702 is provided on the +Y direction side surface of the housing 701 (front side of the recording apparatus 1). The access cover 702 is pivotable between an open position at which the inside of the housing 701 is exposed and a closed position at which the inside of the housing 701 is not exposed.

The recording medium 2 having been subjected to the recording by the recording head 4 is conveyed to the downstream side in the conveyance direction, and reaches the fixing unit 200 arranged downstream of the scanning region of the recording head 4 in the conveyance direction. The recording apparatus 1 is provided with the discharge guide 207 arranged downstream of the platen 6 in the conveyance direction, and the discharge guide 207 supports the back side of the recording medium 2 until the recording medium 2 that has passed on the platen 6 passes through the fixing unit 200. The fixing unit 200 is arranged on the downstream side of the housing 701 in the conveyance direction, and the fixing unit 200 and the housing 701 are separate in the conveyance direction. The fixing unit 200 includes fans 201, heaters 202, a chamber 203, and a thermal insulation member 204. The fixing unit 200 heats by using the heaters 202 the air blown into the chamber 203 by using the fans 201, and blows the heated air to the recording medium 2 through a plurality of air blower holes or slits provided in a chamber bottom 203*a*. In this way, the fixing unit 200 evaporates water or solvent contained in the ink on the recording medium 2. The width of the fixing unit 200 in the X direction is configured to be larger than a maximum value of the width of the recording medium 2 in the X direction, recordable by the recording head 4 in the recording apparatus 1. In this way, the uniformity of the temperature and the air speed of the warm air blown to the recording medium 2 is improved.

The ink used in the present exemplary embodiment contains water-soluble fine resin particles to bring the recording medium 2 and the color material into intimate contact to improve abrasion resistance (fixability) of the recorded image. The fine resin particles are melted by heat, and the fixing unit 200 forms a film of the fine resin particles and dries the solvent contained in the ink. In the present exemplary embodiment, the "fine resin particles" mean polymer fine particles existing in the water in a dispersed state.

As each of the heaters 202, a heater in which an open coil type nichrome wire is supported by a mica and/or an insulator member (not illustrated), or a sheathed heater is used. Each of the heaters 202 is separated from a surface forming the chamber 203, one heater 202 is provided corresponding to one fan 201 as a pair, and the air blown from the fans 201 is heated by the heaters 202 to become warm air. A plurality of the fan 201-and-heater 202 pairs is provided in the width direction of the recording apparatus 1, or in the X direction. The thermal insulation member 204 is provided between the chamber 203 and an outer casing 205 covering the outer periphery of the chamber 203 to prevent the temperature outside the outer casing 205 from becoming high even in a case where the temperature inside the chamber 203 becomes high.

Figure 3:
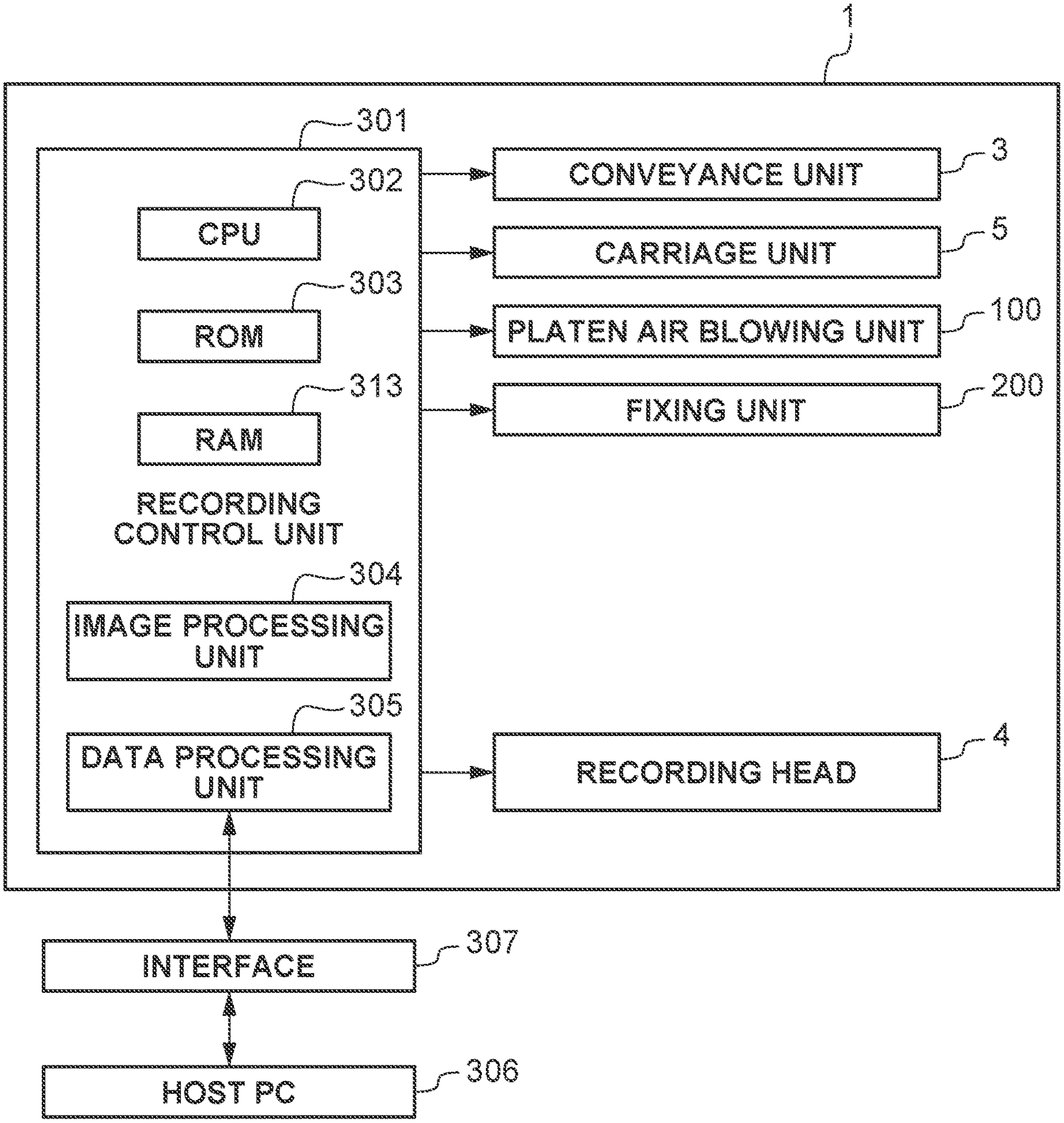
FIG. 3 is a block diagram illustrating a configuration of a recording control system of the recording apparatus.

FIG. 3 is a block diagram illustrating a configuration of a recording control system in the recording apparatus 1 illustrated in FIGS. 1, 2A, and 2B. The recording apparatus 1 is connected to a data supply device, such as a host computer (herein below referred to as a host PC) 306, via an interface 307. Various types of data or control signals related to the recording transmitted from the host PC 306 are input to a recording control unit 301 of the recording apparatus 1. The recording control unit 301 includes a random access memory (RAM) 313 storing input image data, multi-value gray scale data of intermediate products, and multi-path masks, and a central processing unit (CPU) 302 serving as a control calculation device. Application specific integrated circuits (ASIC) can be used instead of the CPU 302. Further, the recording control unit 301 includes a read only memory (ROM) 303 storing control programs for the CPU 302, and various types of data. The recording control unit 301 includes an image processing unit 304 for performing various types of image processing, and a data processing unit 305 for performing various types of data processing. The processing of the image processing unit 304 and the data processing unit 305 may be performed by the CPU 302. The recording control unit 301 controls operations of a conveyance unit 3, the carriage unit 5, the recording head 4, the platen air blowing unit 100, and the fixing unit 200, based on control signals input via the interface 307.

Figure 4B:
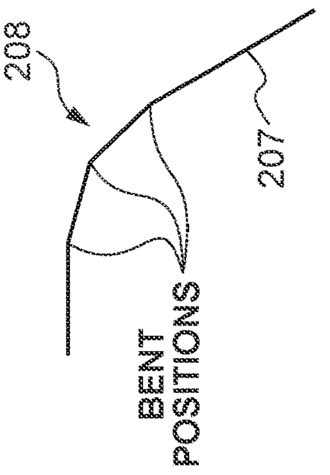
FIGS. 4A, 4B, and 4C are diagrams schematically illustrating a configuration of a fixing unit.
Figure 4C:
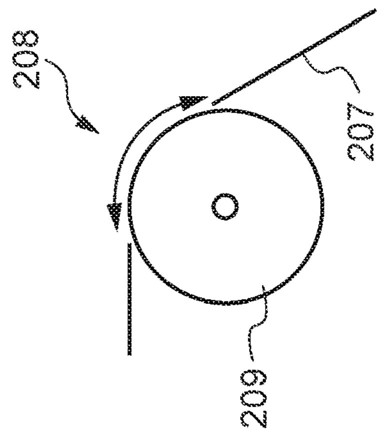
Figure 4A:
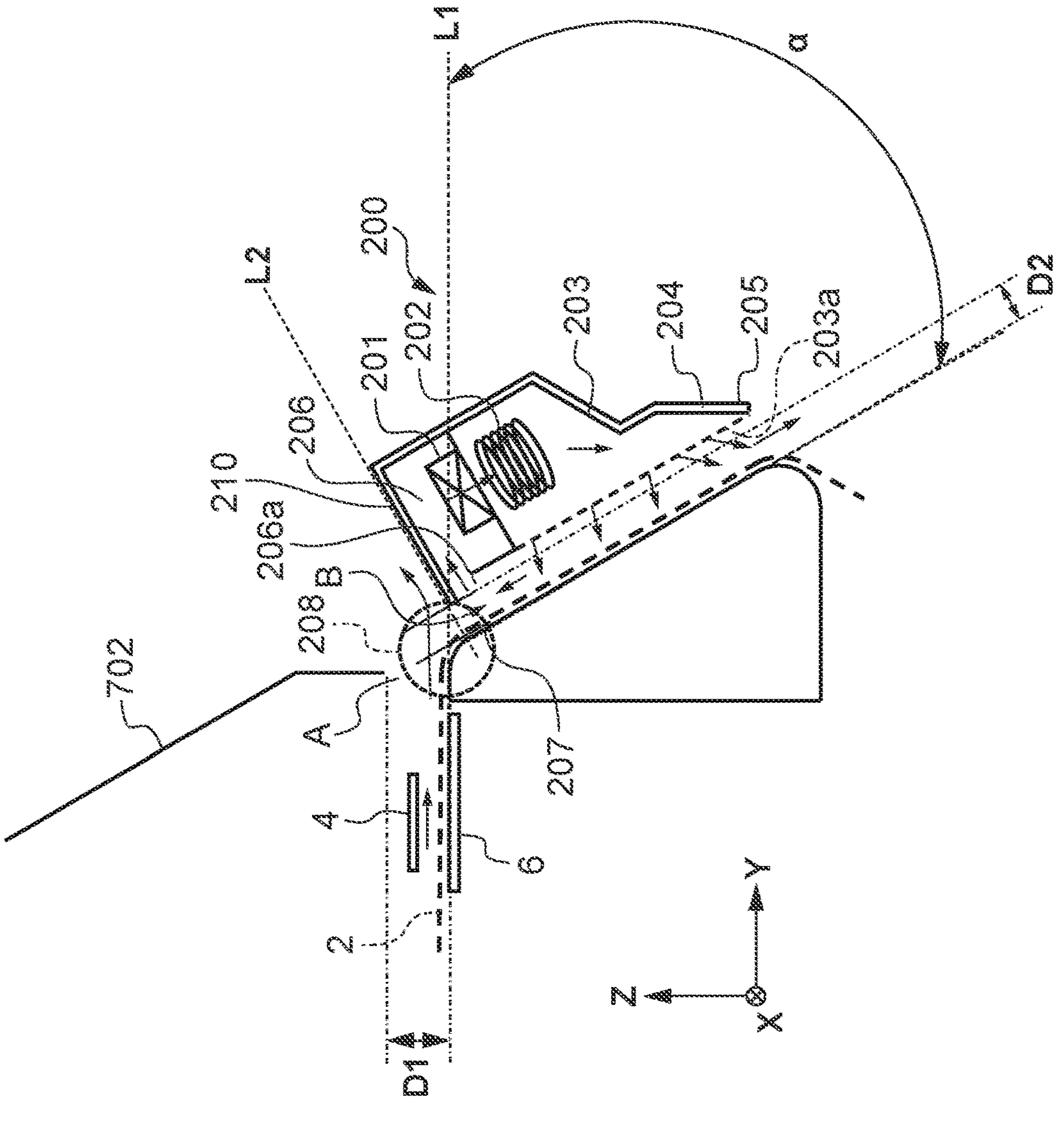

FIGS. 4A, 4B, and 4C are diagrams schematically illustrating a configuration of the fixing unit 200. A part of the warm air blown toward the recording medium 2 from the chamber bottom 203*a* is discharged outside the fixing unit 200 through between the downstream side of the chamber bottom 203*a* in the conveyance direction, and the recording medium 2. The warm air not discharged outside the fixing unit 200 is suctioned by the fans 201 through an air suction opening 206*a* of an air suction unit 206 disposed near the fans 201 on the upstream side in the conveyance direction in the chamber 203. The air suction unit 206 mixes the air outside the chamber 203 and a part of the air blown to the recording medium 2 from the chamber bottom 203*a*, and the fans 201 blow the mixed air to the heaters 202 to heat the mixed air. In this way, the fixing unit 200 is configured to circulate part of the warm air to be used to dry the recording medium 2. In the present exemplary embodiment, the air suction unit 206 and the chamber 203 are collectively covered by the outer casing 205, and the thermal insulation member 204 is provided inside the outer casing 205, so that the outside of the outer casing 205 does not become high in temperature even in a case where the air suction unit 206 and/or the chamber 203 become high in temperature.

The discharge guide 207 includes a curved plane 208 between the platen 6 and the fixing unit 200, so that a surface of the discharge guide 207 facing the fixing unit 200 inclines at an angle $\alpha$ with respect to an extension line L1 of the upper surface of the platen 6. This configuration reduces the whole size of the recording apparatus 1 in the Y direction as compared with a case where the discharge guide 207 does not include the curved plane 208 and extends on the extension line L1 of the upper surface of the platen 6.

As described above, the mist occurring near the recording head 4 is removed from the vicinity of the recording head 4 by the air blown out from the platen air blowing unit 100, and discharged through a gap A, which is an opening between the access cover 702 and the discharge guide 207. The air blown out from the platen air blowing unit 100 is blown to the recording medium 2 on the platen 6, and flows directly along the recording medium 2 toward the gap A. Accordingly, the air containing the mist discharged through the gap A is discharged along the extension line L1 of the platen 6. In the present exemplary embodiment, the air suction opening 206*a* of the fixing unit 200 is arranged below the extension line L1 of the upper surface of the platen 6 in a Z direction. The air suction opening 206*a* is arranged below a normal line L2 orthogonal to the discharge guide 207 with the end portion of the curved plane 208 as a starting point. The space between the housing 701 and the fixing unit 200 is exposed to the external air, so that the air containing mist discharged through the gap A toward the extension line L1 direction is guided in the +Z direction along a side surface 210 on the upstream side of the outer casing 205 of the fixing unit 200 in the conveyance direction.

The curved plane 208 may not be an arc-shaped plane, and may be a curved plane formed by continuously connecting a plurality of flat planes as illustrated in FIG. 4B, or a curved plane formed by bending a flat plate. For example, in a case where a metal plate material, such as a stainless steel plate, is used for the discharge guide 207, the curved plane 208 is formable by bending the plate material a plurality of times at obtuse angles. In such a case, it is possible to form the curved plane 208 more easily than formation of the curved plane 208 in the arc-shape.

The curved plane 208 may be configured with a rotational member, such as a roller 209, as illustrated in FIG. 4C. In a case where the curved plane 208 is configured with the roller 209, the roller 209 rotates when the recording medium 2 passes on the curved plane 208, so that the recording medium 2 is smoothly conveyable. This configuration controls the occurrence of jams due to the resistance which may occur on the curved plane 208.

The relationship between a height D1 of the gap A and a height D2 of a gap B, which is an opening from the air suction opening 206*a* to the discharge guide 207, is set to satisfy $D1<D2$, so that the air containing the mist discharged through the gap A does not easily enter the gap B. However, the relationship between the heights D1 and D2 is not limited to $D1<D2$, and may also be $D1\geq D2$.

With the configuration described above, since the air containing mist discharged from the gap A is guided in the +Z direction with respect to the extension line L1, it is possible to prevent the mist from entering the air suction opening 206*a*. Accordingly, it is possible to prevent the mist from adhering to and firmly fixing the fans 201, thus controlling the performance degradation of the fixing unit 200.

A second exemplary embodiment will be described below. Descriptions of configurations similar to those according to the first exemplary embodiment are omitted.

Figure 5:
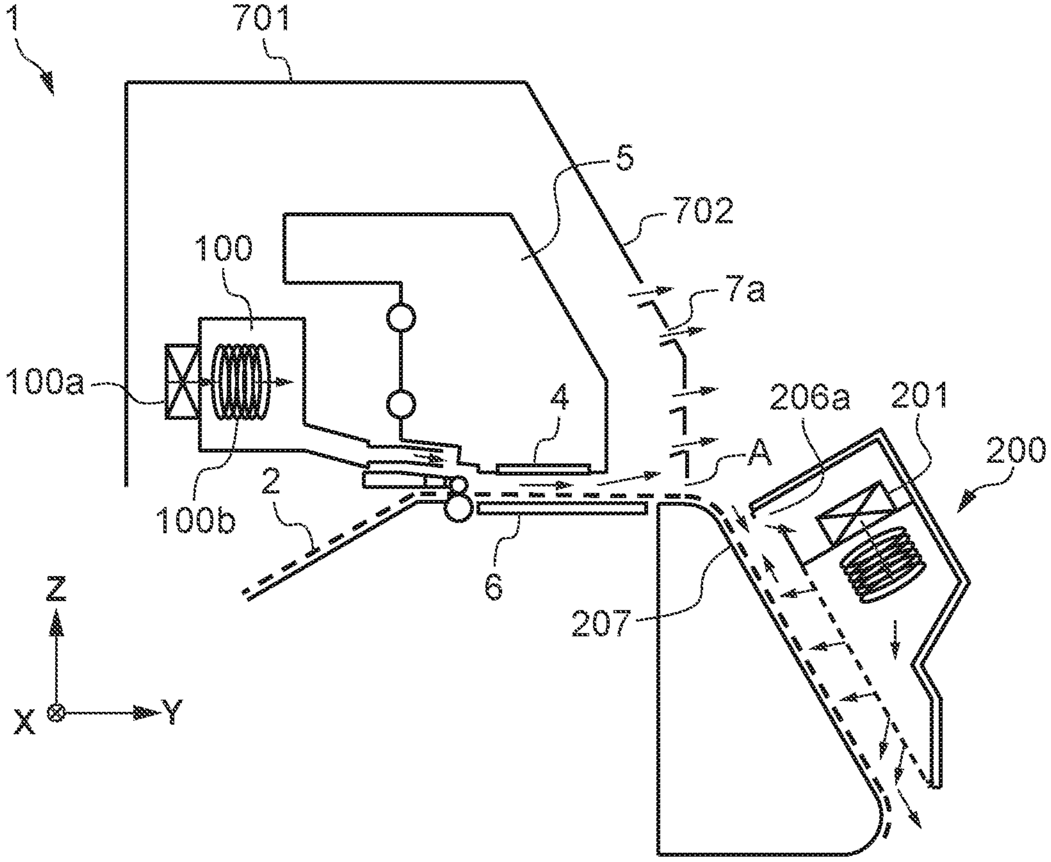
FIG. 5 is a diagram schematically illustrating a recording apparatus according to a second exemplary embodiment.

FIG. 5 is a diagram schematically illustrating a recording apparatus according to the second exemplary embodiment. In the second exemplary embodiment, a description will be provided of a configuration, in which holes (air discharge ports 7*a*) are provided in the access cover 702, and air containing mist blown out from the platen air blowing unit 100 through these holes is discharged outside.

In the present exemplary embodiment, the air discharge ports 7*a* are provided in the access cover 702, and the air in the housing 701 is dischargeable through the air discharge ports 7*a*. Part of the air containing mist moved from the vicinity of the recording head 4 by the platen air blowing unit 100 is discharged through the air discharge ports 7*a*.

The air discharge ports 7*a* are disposed above the air suction opening 206*a*, so that the mist discharged through the air discharge ports 7*a* is prevented from being taken into the fans 201 through the air suction opening 206*a*. Each of the air discharge ports 7*a* may be a simple shape hole, such as a circular hole and a rectangular slit hole, but it is possible to adopt a louvered hole. In a case where the louvered holes are adopted as the air discharge ports 7*a*, each of the air discharge ports 7*a* is opened at an angle at which the fixing unit 200 is not present on an extension line of the opening of the louver. More specifically, each of the air discharge ports 7*a* is opened in such a manner that the extension line of the louver of each of the air discharge ports 7*a* in the opening direction passes above the fixing unit 200. This configuration keeps the mist discharged through the air discharge ports 7*a* away from the air suction opening 206*a* more efficiently, thus preventing the mist from entering the air suction unit 206. This leads to prevention of mist from adhering to the fans 201, thus preventing the driving of the fans 201 from being disturbed.

Even in a case where each of the air discharge ports 7*a* is not configured to be a louvered hole, it is possible to direct the air discharged from the housing 701. For example, an air direction adjusting plate 7*b* having an inclination for upwardly guiding the air flow is disposed near the gap A as illustrated in FIG. 6A, so that air having passed near the recording head 4 is upwardly guided and discharged through the air discharge ports 7*a*. In this case, since the air direction adjusting plate 7*b* directs discharged air even with the air discharge ports 7*a* each formed in a round hole or a rectangular slot hole, but not the louvered hole, the air containing mist is upwardly discharged through the air discharge ports 7*a*. More specifically, it is desirable that the air direction adjusting plate 7*b* have an inclination with an angle forming an approximately middle between the air blowing out direction from the platen air blowing unit 100 and the +Z direction.

Figure 6B:
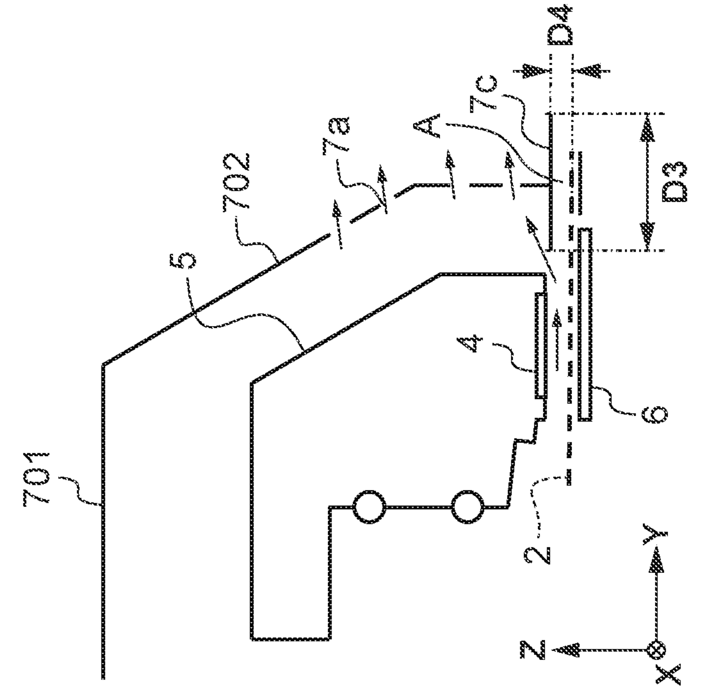
FIGS. 6A and 6B are diagrams schematically illustrating a recording apparatus according to a modification example of the second exemplary embodiment.
Figure 6A:
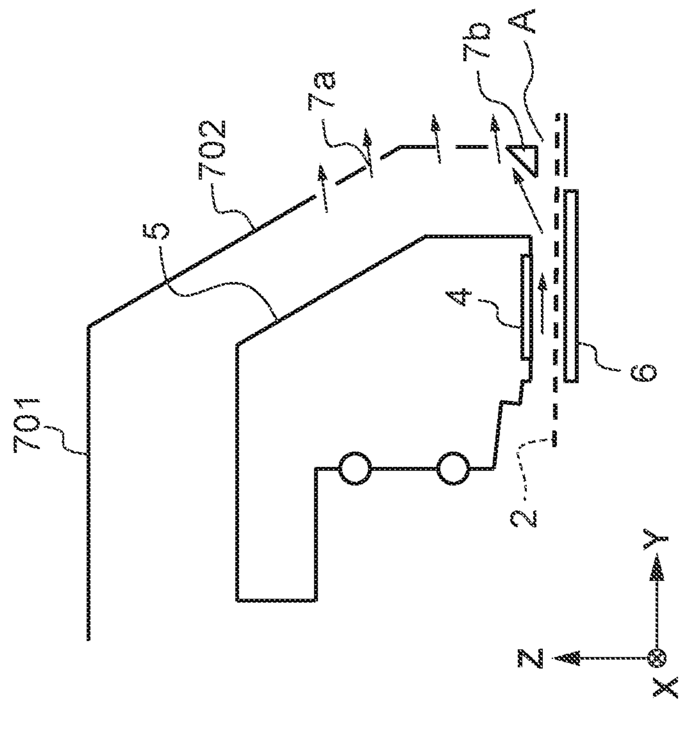

Further, instead of the air direction adjusting plate 7*b*, a flow path resistance plate 7*c* extending in the Y direction may be disposed above the gap A as illustrated in FIG. 6B. The flow path resistance plate 7*c* is disposed to be generally parallel to the recording medium 2 in the gap A. Assuming that the length of the flow path resistance plate 7*c* in the Y direction is D3, and that the distance between the flow path resistance plate 7*c* and the recording medium 2 is D4, the pressure loss in the gap A increases in proportion to D3/D4. This pressure loss amount becomes the flow path resistance of the air that is passing through the gap A. Accordingly, the air is not easily discharged through the gap A, which facilitates moving the air blown out from the platen air blowing unit 100 to the air discharge ports 7*a*. Thus, the mist discharged through the gap A reduces, so that the mist moving toward the vicinity of the air suction opening 206*a* also reduces.

With these configurations described above, the mist having occurred in the housing 701 is discharged through not only the gap A but also through the air discharge ports 7*a*, the amount of mist discharged through the gap A relatively reduces, thus reducing the mist discharged to the vicinity of the air suction opening 206*a* of the fixing unit 200. This prevents mist from adhering to the fans 201 through the air suction opening 206*a*.

The shapes of the air discharge ports 7*a* and the arrangements of the air direction adjusting plate 7*b* and the flow path resistance plate 7*c* may be combined to discharge the mist through the air discharge ports 7*a*.

A third exemplary embodiment will be described below. Descriptions of configurations similar to those according to the first and second exemplary embodiments will be omitted.

Figure 7:
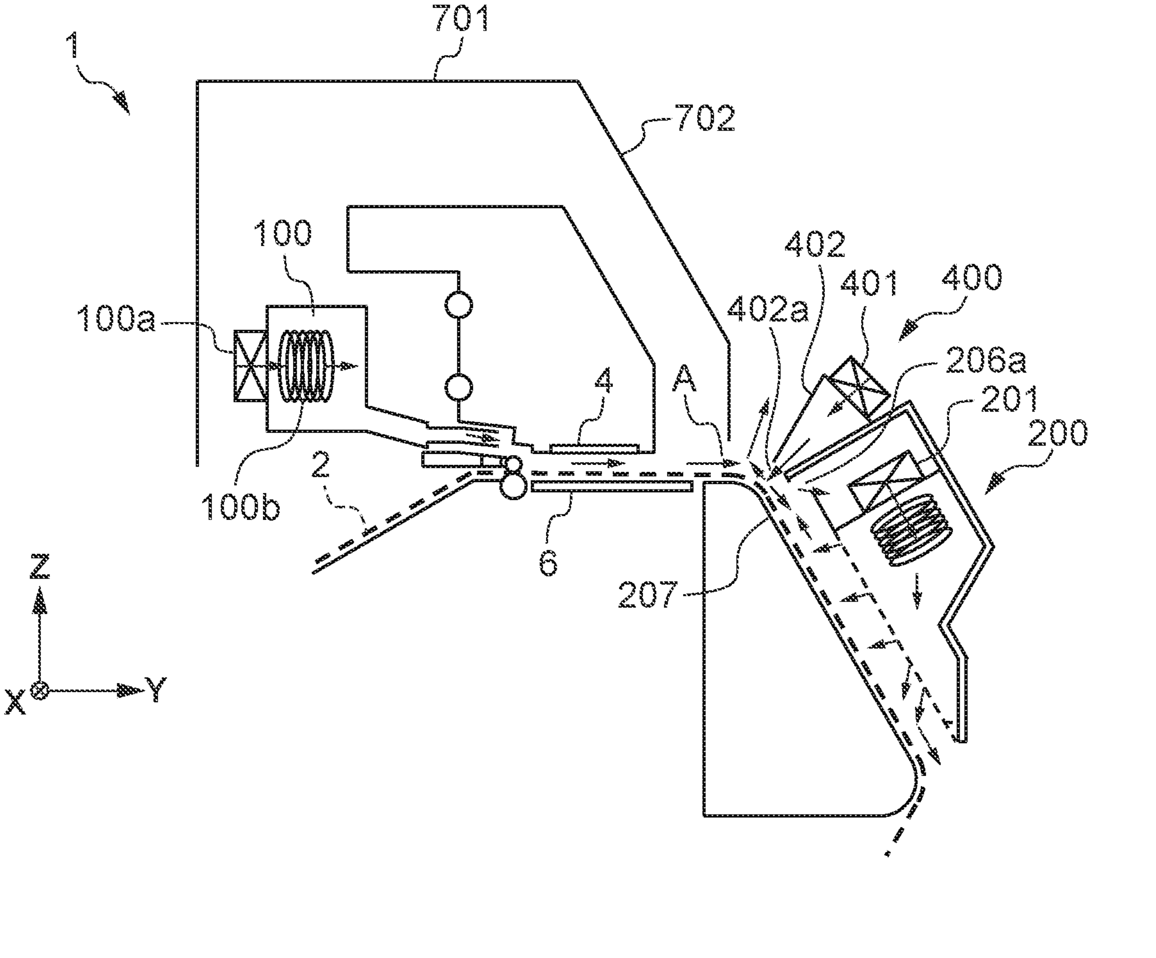
FIG. 7 is a diagram schematically illustrating a recording apparatus according to a third exemplary embodiment.

FIG. 7 is a diagram schematically illustrating a recording apparatus according to the present exemplary embodiment. The recording apparatus 1 according to the present exemplary embodiment includes an air curtain unit 400 arranged adjacent to the upstream of the fixing unit 200 in the conveyance direction. The air curtain unit 400 includes air curtain fans 401 and an air curtain duct 402. The air blown out from the air curtain fans 401 is discharged through an air discharge portion 402*a* of the air curtain duct 402, and blown to the recording medium 2. The air curtain duct 402 is configured to blow out air toward a direction perpendicular to the discharge guide 207 facing the fixing unit 200 or the downstream side in the conveyance direction. With this configuration, the flow of the air containing the mist discharged from the gap A is blocked by the air blown from the air curtain duct 402, and it is possible to prevent the air flow from entering the air suction opening 206*a*. In the present exemplary embodiment, the widths of the air curtain duct 402 and the air discharge portion 402*a* in the X direction are configured to be generally equal to the width of the fixing unit 200 in the X direction. In this way, the air blown out from the air curtain unit 400 can uniformly block the air suction opening 206*a* in the X direction. Further, the air containing mist flows to the atmosphere through a space between the access cover 702 and the air curtain unit 400 due to the flow of the air blown from the air curtain duct 402. In this way, it is possible to prevent the mist from adhering to the fans 201 from the air suction opening 206*a*.

Figure 8:
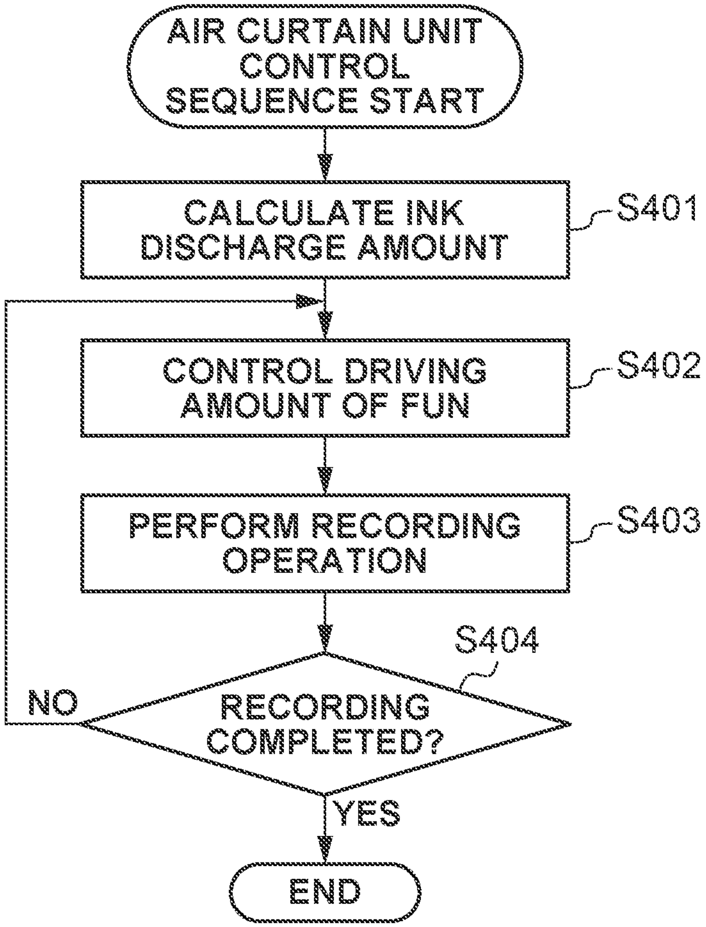
FIG. 8 is a flowchart illustrating an air curtain unit control sequence according to the third exemplary embodiment.

Each of the air curtain fans 401 may be driven to blow out air continuously at a constant speed, but the driving amount of each of the air curtain fans 401 may be changed depending on the recording operation of the recording head 4. For example, the recording head 4 may change driving amounts of air curtain fans 401 depending on the amount of ink to be discharged to the recording medium 2, thus increasing or decreasing the blowing air amount from the air curtain duct 402. An air curtain unit control sequence in the case where the driving amounts of the air curtain fans 401 are changed depending on the discharge amount of ink to be discharged by the recording head 4 will be described with reference to FIG. 8.

This sequence starts when the recording control unit 301 receives a print instruction. Upon start of the air curtain unit control sequence, in step S401, the CPU 302 calculates an ink discharge amount to be discharged to the recording medium 2 by the recording head 4, based on print data received by the recording control unit 301. Here, the ink discharge amount to be calculated may be an ink discharge amount to be used to record the received entire print data on the recording medium 2, or may be an average value of ink amounts to be discharged per unit time (e.g., per 0.1 seconds) when the print data is printed on the recording medium 2. The ink amount to be discharged per unit time may be calculated at each unit time. The CPU 302 calculates the ink discharge amount in step S401, and then the processing proceeds to step S402. In step S402, the CPU 302 controls the driving amount of each of the air curtain fans 401 of the air curtain unit 400, based on the ink discharge amount calculated in step S401. As the ink discharge amount calculated in step S401 is larger, the amount of mist to occur around the recording head 4 becomes larger. Thus, in step S402, the CPU 302 sets the driving amount of each of the air curtain fans 401 to a large value. On the other hand, as the ink discharge amount calculated in step S401 is smaller, the CPU 302 sets the driving amount of each of the air curtain fans 401 to a smaller value.

The relationship between the ink discharge amount of the recording head 4 and the driving amount of each of the air curtain fans 401 is set based on a table stored in the ROM 303.

The CPU 302 controls the driving amount of each of the air curtain fans 401 in step S402 based on the ink discharge amount of the recording head 4, and then the processing proceeds to step S403. In step S403, the recording head 4 starts a recording operation, and then the processing proceeds to step S404. In step S404, the CPU 302 determines whether the recording of the print data received by the recording control unit 301 onto the recording medium 2 is completed. In step S404, if the CPU 302 determines that the recording is completed (YES in step S404), the CPU 302 stops the air curtain fans 401, or controls the driving amount of each of the air curtain fans 401 to a predetermined amount. Then, the CPU 302 ends the air curtain unit control sequence. In step S404, if the CPU 302 determines that the recording is not completed (NO in step S404), the processing returns to step S402, and the CPU 302 repeats the operations in steps S402 to S404.

The configuration described above makes it possible to change the driving amount of each of the air curtain fans 401 depending on whether the ink discharge amount is large or small during the recording operation of the recording head 4. Thus, the flow rate of the air blown out from each of the air curtain fans 401 is changeable. In particular, for a small amount of the ink to be discharged by the recording head 4, the driving amount of each of the air curtain fans 401 can be made small, so that it is possible to reduce the noise and/or the power consumption amount due to the driving of the air curtain fans 401.

The recording control unit 301 is also capable of controlling the flow rate of the air to be blown by the platen air blowing fan 100*a*, by changing the driving amount of the platen air blowing fan 100*a* of the platen air blowing unit 100. The driving amount of the platen air blowing fan 100*a* is controlled based on whether the recording medium 2 is an absorbent recording medium or a non-absorbent recording medium. Examples of the non-absorbent recording medium include glass, plastic, film, and YUPO® brand synthetic paper, which are not intended for recording media for aqueous ink-jet ink. Other examples of the non-absorbent recording medium include a medium on which surface treatment is not performed for ink-jet printing (i.e., ink adsorption layer is not formed), such as a plastic film, paper, or the like on which plastic coating and the like is performed. Examples of the plastic include polyvinyl chloride, polyethylene terephthalate, polycarbonate, polystyrene, polyurethane, polyethylene, and polypropylene. Specific examples of the non-absorbent recording medium include print paper used for offset printing or the like, such as art paper and coated paper.

The type of the recording medium 2 may be set by a user manually inputting the type in the recording apparatus 1, or may be automatically detected by a detection unit, such as an optical sensor. When the type of the recording medium 2 is set, the recording control unit 301 controls the driving amount of the platen air blowing fan 100*a* depending on the type of the recording medium 2. More specifically, in a case where the type of the recording medium 2 is a non-absorbent recording medium, the driving amount of the platen air blowing fan 100*a* is set to a small value, and in a case where the type of the recording medium 2 is an absorbent recording medium, the driving amount of the platen air blowing fan 100*a* is set to a large value. In this case, when the driving amount of the platen air blowing fan 100*a* is set to a large value to increase the air amount blown from the platen air blowing unit 100, the amount of air containing mist discharged from the gap A increases, which leads the air to easily reach the fixing unit 200. Thus, the driving amount of each of the air curtain fans 401 is set to a large value to prevent the mist from flowing into the air suction opening 206*a*. On the other hand, when the driving amount of the platen air blowing fan 100*a* is set to a small value, and the air amount blown from the platen air blowing unit 100 decreases, the amount of the air containing mist blown from the gap A also decreases. Accordingly, even when the driving amount of each of the air curtain fans 401 is set to a small value, it is possible to prevent the mist from flowing into the air suction opening 206*a*. The driving amount of the platen air blowing fan 100*a* may be changed depending on the amount of ink to be discharged by the recording head 4, as with each of the air curtain fans 401, not only for the type of the recording medium 2.

Figure 9:
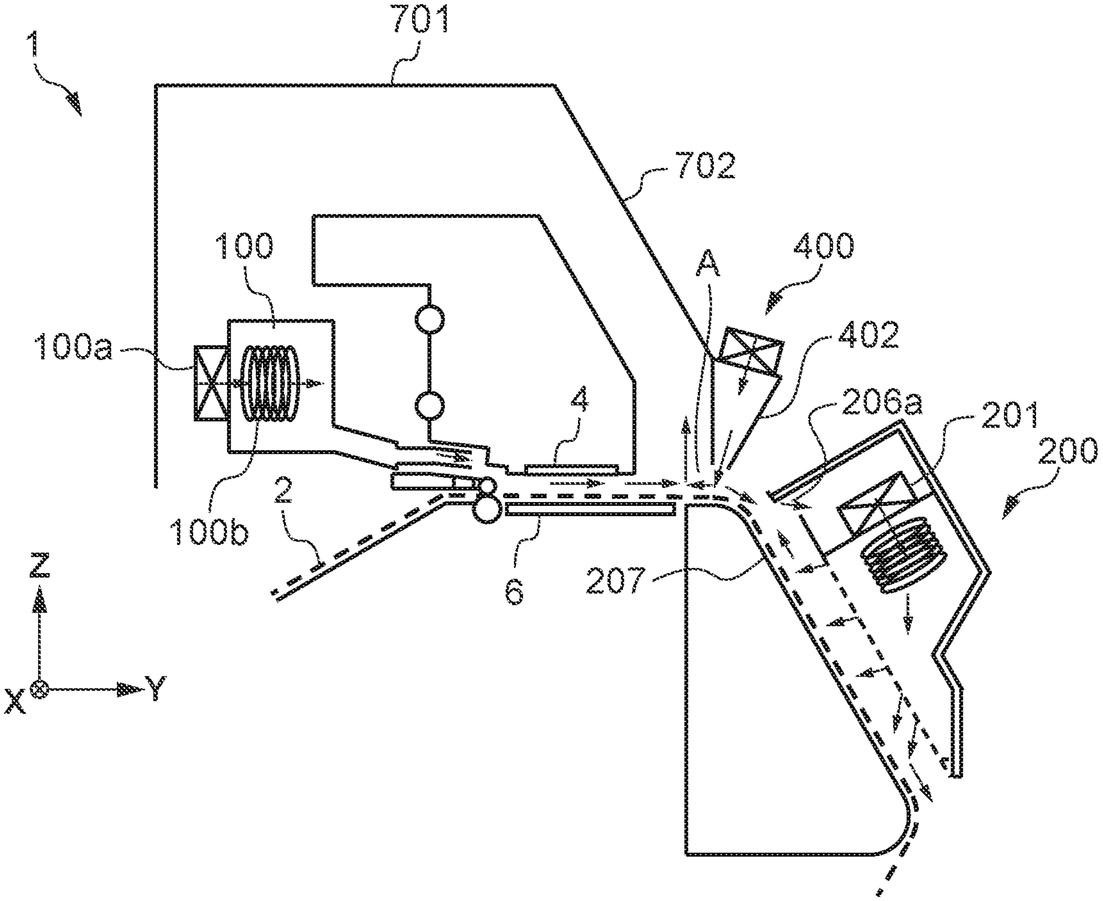
FIG. 9 is a diagram schematically illustrating a recording apparatus according to a modification example of the third exemplary embodiment.
Figure 10:
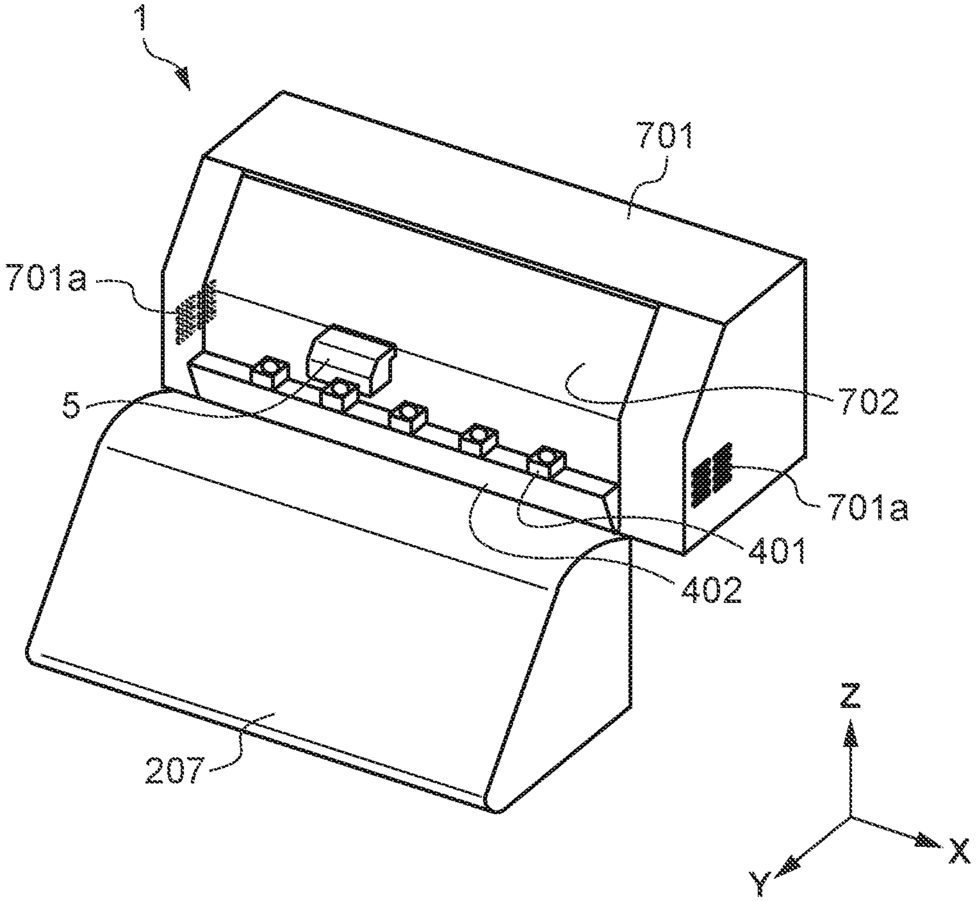
FIG. 10 is a diagram illustrating an external appearance of the recording apparatus according to the modification example of the third exemplary embodiment.

FIGS. 9 and 10 are diagrams schematically illustrating a recording apparatus according to a modification example of the present exemplary embodiment. In the recording apparatus 1 described with reference to FIG. 7, the air curtain unit 400 is arranged adjacent to the fixing unit 200, but the air curtain unit 400 may be arranged between the recording head 4 and the fixing unit 200. In FIG. 9, the air curtain unit 400 is arranged adjacent to the access cover 702. The air curtain unit 400 may configure a part of the access cover 702. Since the air curtain unit 400 blows air to the recording medium 2 or the discharge guide 207 arranged downstream of the gap A in the conveyance direction, the air including mist is prevented from discharging outside the housing 701 from the gap A. Accordingly, the mist occurring near the recording head 4 is not discharged from the gap A, and is accumulated in the housing 701. Thus, it is possible to prevent the mist from reaching the fixing unit 200 and flowing into the air suction opening 206*a*.

In the present exemplary embodiment, since the air blown by the platen air blowing unit 100 accumulates in the housing 701, the pressure in the housing 701 may sometimes increase. Thus, as illustrated in FIG. 10, air discharge ports 701*a* are provided in part of the housing 701 so that the air in the housing 701 is discharged through the air discharge ports 701*a*. Each of the air discharge ports 701*a* is desirably provided at a position on an extension line of the scanning direction of the carriage unit 5 in the housing 701. The arrangement of the air discharge ports 701*a* on the extension line of the scanning direction of the carriage unit 5 enables the mist to be discharged outside the housing 701 from the air discharge ports 701*a* by agency of the air flow that occurs when the carriage unit 5 reciprocally moves.

In the present exemplary embodiment, the plurality of air curtain fans 401 is arranged in the X direction, but only one air curtain fan 401 may be arranged in the X direction. A plurality of the air curtain ducts 402 may be arranged in the X direction or in the Y direction side by side.

A fourth exemplary embodiment will be described below. Descriptions of configurations similar to those according to the first to third exemplary embodiments are omitted.

In the first to third exemplary embodiments, the housing 701 and the fixing unit 200 are separately arranged in the Y direction, but in the present exemplary embodiment, a configuration in which the housing 701 and the fixing unit 200 are connected will be described.

Figure 11:
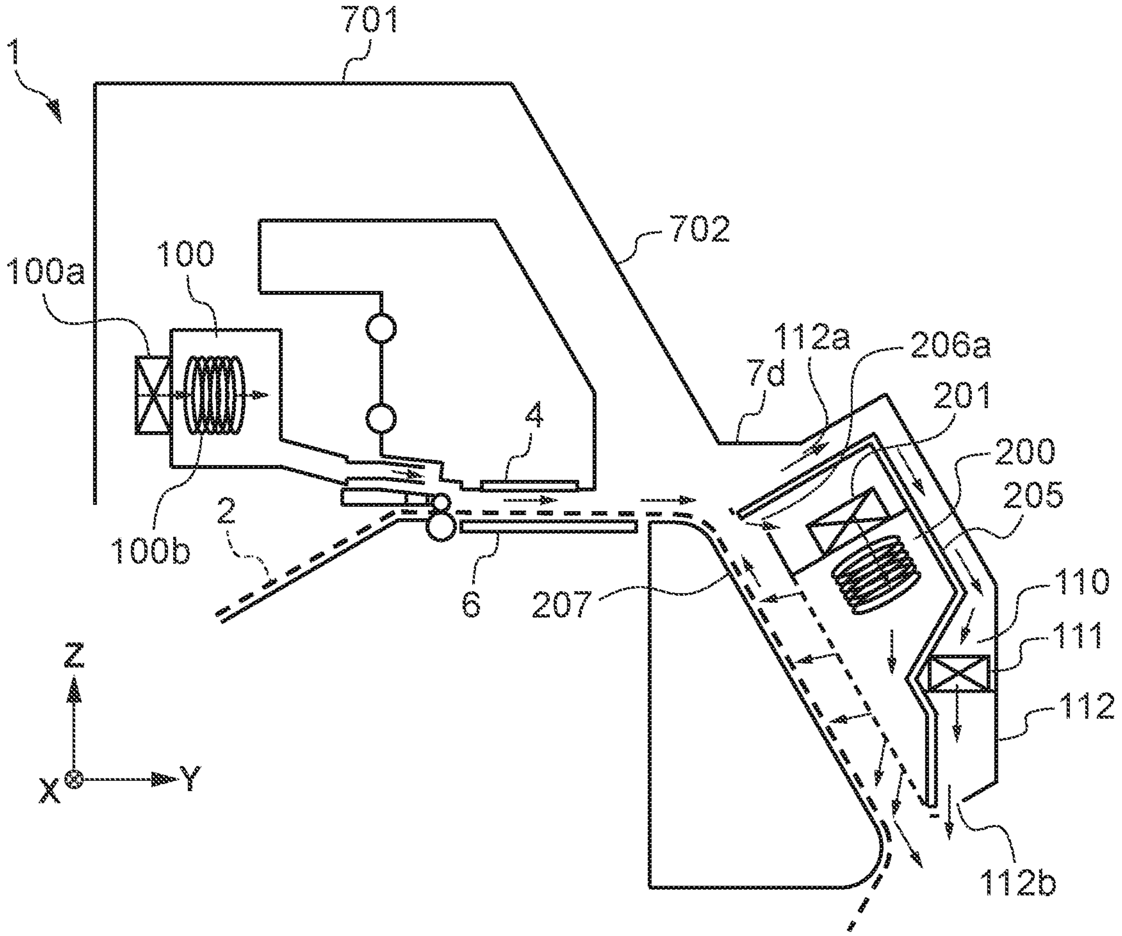
FIG. 11 is a diagram schematically illustrating a recording apparatus according to a fourth exemplary embodiment.

FIG. 11 is a diagram schematically illustrating a recording apparatus according to the present exemplary embodiment. In the present exemplary embodiment, a connection portion 7*d* connects the access cover 702 provided on the housing 701 and the fixing unit 200. The recording apparatus 1 according to the present exemplary embodiment includes a downflow unit 112 serving as an air discharge unit including a downflow duct 110 and a downflow fan 111. On the further external side of the outer casing 205 of the fixing unit 200, the downflow duct 110 is provided, and the downflow fan 111 is provided in the downflow duct 110. The downflow fan 111 is a fan for blowing air from the upstream side to the downstream side in the conveyance direction. The downflow duct 110 includes an air suction port 112*a* disposed upstream of the air suction opening 206*a* of the fixing unit 200 in the conveyance direction, and an air discharge port 112*b* disposed downstream of the fixing unit 200 in the conveyance direction. Air is suctioned through the air suction port 112*a* and discharged through the air discharge port 112*b*, by driving the downflow fan 111.

The air containing mist occurring near the recording head 4 is blown to the downstream side in the conveyance direction by the platen air blowing unit 100, suctioned through the air suction port 112*a* of the downflow duct 110, and discharged through the air discharge port 112*b*. Here, the air not suctioned through the air suction port 112*a* may also flow into the air suction opening 206*a* due to the suction of the fans 201 of the fixing unit 200. The amount of air flowing into the air suction port 112*a* can be increased by setting the opening area of the air suction port 112*a* larger than that of the air suction opening 206*a*, or setting the driving amount of the downflow fan 111 larger than the driving amount of the fans 201 of the fixing unit 200. Since the amount of mist flowing into the air suction opening 206*a* can be reduced by increasing the amount of air suctioned in the downflow duct 110, it is possible to prevent the driving of the fans 201 from being disturbed due to the mist adhering to the fans 201. Further, since the heat transmitted to the outer casing 205 of the fixing unit 200 can be cooled by the blown air in the downflow duct 110, it is also possible to prevent the heat transfer to the external surface of the downflow duct 110.

The downflow fan 111 is desirably arranged on the air discharge port 112*b* side in the downflow duct 110. When the air containing mist flows into the downflow duct 110, the mist contained in the air gradually adheres to the inner wall surface of the downflow duct 110, and the mist amount in the air gradually decreases. Thus, as the downflow fan 111 is arranged nearer to the air discharge port 112*b*, the amount of mist adhering to the downflow fan 111 can be smaller. In this way, it is possible to prevent the driving of the downflow fan 111 from being disturbed due to the mist adhering thereto. Further, as the air suction port 112*a* and the recording head 4 are arranged nearer to each other, the mist can be suctioned into the downflow unit 112 more efficiently.

The downflow fan 111 may be continuously driven at a constant speed to blow air, but the driving amount of the downflow fan 111 may be changed depending on the recording operation of the recording head 4. For example, the driving amount of the downflow fan 111 can be changed depending on the amount of ink to be discharged by the recording head 4 onto the recording medium 2, to increase or decrease the air suction amount of the downflow duct 110. The downflow fan 111 can be controlled similarly to the air curtain fans 401 described in conjunction with FIG. 8 according to the third exemplary embodiment. In a case where the ink discharge amount by the recording head 4 is large, the driving amount of the downflow fan 111 is set large to increase the air flow-in amount into the air suction port 112*a* of the downflow duct 110. On the other hand, in a case where the ink discharge amount by the recording head 4 is small, the driving amount of the downflow fan 111 is set small. In this way, for a large amount of mist occurring, the mist is efficiently discharged by the downflow unit 112, and for a small amount of mist occurring, it is possible to reduce the noise due to the driving of the downflow fan 111 and/or the power consumption of the downflow fan 111.

The air discharged from the air discharge port 112*b* of the downflow duct 110 is blown to the recording medium 2 on the discharge guide 207. In this way, since the recording medium 2 and the ink with the temperature having been increased by passing through inside the fixing unit 200 can be cooled, it is possible to prevent the heat from being accumulated when the printed recording medium 2 is collected by rolling up the printed recording medium 2 or the like.

Figure 12B:
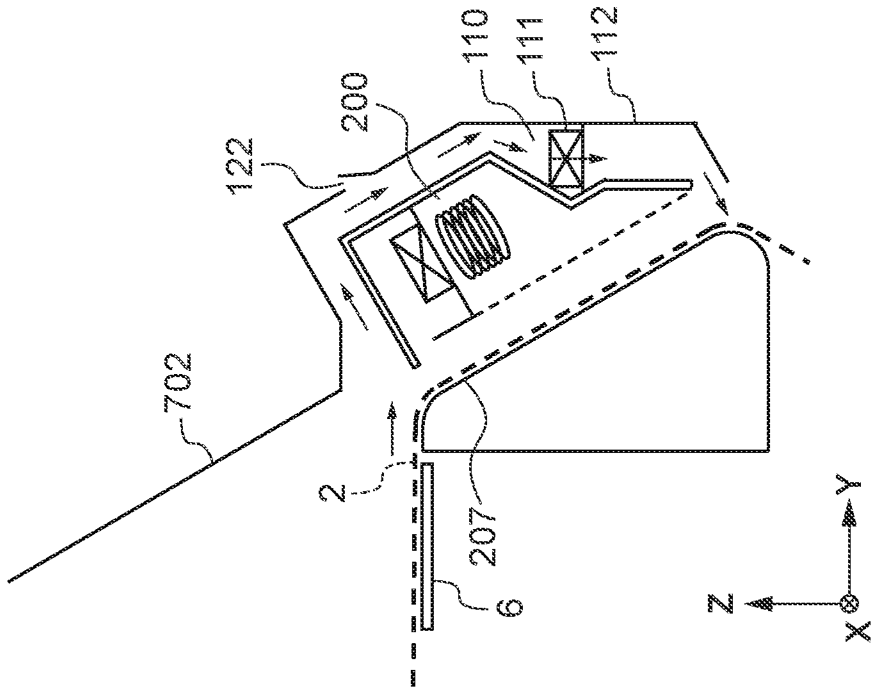
FIGS. 12A and 12B are diagrams schematically illustrating a recording apparatus according to a modification example of the fourth exemplary embodiment.
Figure 12A:
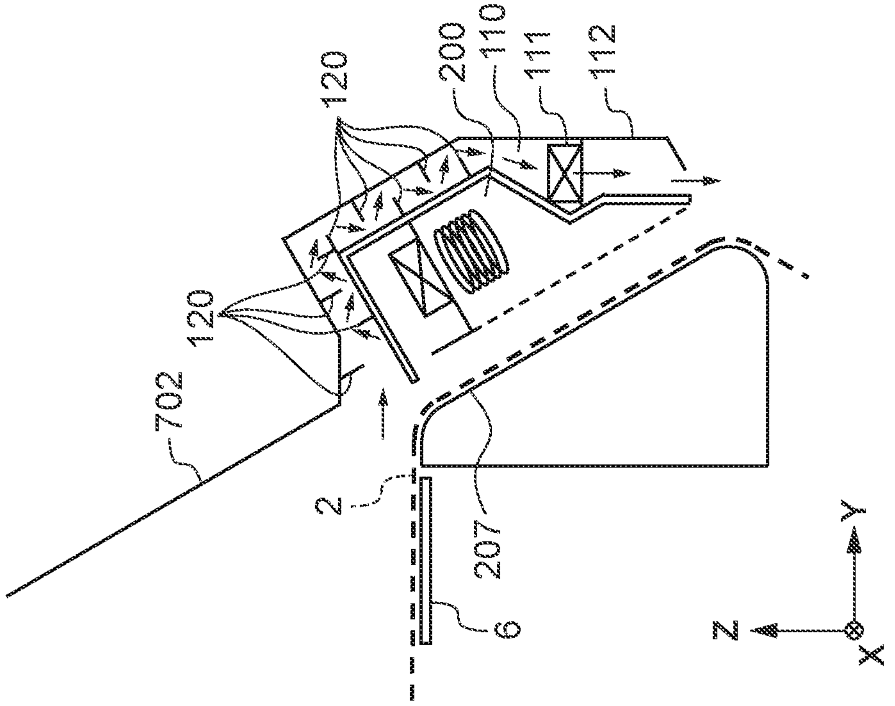

FIGS. 12A and 12B are diagrams schematically illustrating a recording apparatus according to a modification example of the fourth exemplary embodiment. As illustrated in FIG. 12A, the downflow duct 110 is provided with ribs 120 on the inner wall of the downflow duct 110 to complicate an air flow path structure (labyrinth structure), thus facilitating adhesion of the mist to the inner wall of the downflow duct 110. A plurality of the ribs 120 may be provided, or only one rib 120 may be provided. This configuration further reduces adhesion of the mist to the downflow fan 111. A filter may be provided in the downflow duct 110 to collect the mist.

An external air introduction port 122 may be provided in part of the downflow duct 110, to mix the air from the housing 701 and the external air, in the downflow duct 110. The air in the downflow duct 110 may become warm due to the heat conduction from the outer casing 205 of the fixing unit 200, but the inside of the downflow duct 110 can be cooled by taking thereinto the external air through the external air introduction port 122. It is also possible to efficiently cool the recording medium 2, by blowing the air cooled by taking in the external air through the external air introduction port 122, to the recording medium 2 through the air discharge port 112*b*.

The first to fourth exemplary embodiments may be combined, and even in this case, it is possible to prevent the mist from adhering to the fans 201 of the fixing unit 200.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-192357, filed Nov. 30, 2022, and No. 2022-192358, filed Nov. 30, 2022, which are hereby incorporated by reference herein in their entirety.

What is claimed is:

1. A recording apparatus comprising:

a recording head configured to discharge liquid onto a recording medium to perform recording in a recording region;

a conveyance unit configured to convey the recording medium in a first direction;

a housing configured to cover the recording head, and having an opening in a side surface of the housing on a downstream side of the recording head in the first direction;

a first heating unit that is arranged upstream of the recording head in the first direction in the housing, that includes a first heater and a first fan, and is configured to blow air in the recording region;

a second heating unit that is arranged downstream of the recording head in the first direction outside the housing, that includes a second heater and a second fan, and is configured to blow warm air to the recording medium; and an air curtain unit disposed between the first heating unit and the second heating unit, and configured to blow air to the recording medium, wherein the second fan is configured to suction air from an air suction unit disposed to face the recording medium, and the air suction unit is arranged below the side surface opening in a gravitational direction.

2. The recording apparatus according to claim 1, wherein the second heating unit blows air suctioned from the air suction unit to the recording medium by using the second fan.

3. The recording apparatus according to claim 1, wherein the air curtain unit is arranged upstream of the air suction unit in the first direction and adjacent to the air suction unit.

4. The recording apparatus according to claim 1, wherein the air curtain unit is disposed downstream of the side surface of the housing in the first direction and adjacent to the side surface of the housing.

5. The recording apparatus according to claim 1, further comprising a duct including a discharge portion configured to suction the warm air blown from the first heating unit and discharged from the side surface opening at a second air suction unit disposed upstream of the air suction unit in the first direction, and to discharge the suctioned air downstream of the second heating unit in the first direction.

6. The recording apparatus according to claim 5, wherein the duct is disposed along an outer casing of the second heating unit.

7. The recording apparatus according to claim 5, wherein a third fan is provided in the duct.

8. The recording apparatus according to claim 5, wherein the duct includes an external air introduction portion configured to introduce external air into the duct.

9. The recording apparatus according to claim 5, wherein a plurality of ribs is disposed inside the duct.

10. The recording apparatus according to claim 1, further comprising:

a nozzle positioned at a bottom surface of the recording head and configured to discharge liquid;

a platen configured to face the bottom surface; and a guide facing the second heating unit and configured to support the recording medium, wherein the guide inclines downward in the gravitational direction with respect to the platen.

11. The recording apparatus according to claim 10, wherein the air suction unit is disposed below the platen in the gravitational direction.

12. The recording apparatus according to claim 10, wherein a curved plane connects the platen and the guide.

13. The recording apparatus according to claim 12, wherein the air suction unit is disposed downstream, in the first direction, of a normal line drawn to the guide from a downstream end of the curved plane in the first direction serving as a starting point.

14. The recording apparatus according to claim 12, wherein the curved plane is formed by connection of a plurality of planes.

15. The recording apparatus according to claim 12, wherein the curved plane includes a rotational member between the platen and the guide.

16. The recording apparatus according to claim 1, wherein the side surface opening includes a plurality of louvered openings.

17. The recording apparatus according to claim 16, wherein the housing includes a guiding member configured to guide the warm air blown from the first heating unit to the side surface opening.

18. The recording apparatus according to claim 1, wherein the liquid discharged onto the recording medium forms a film on the recording medium by heating.

* * * * *